United States Patent
Wang

(10) Patent No.: US 7,663,688 B2
(45) Date of Patent: Feb. 16, 2010

(54) IMAGE CAPTURE APPARATUS AND FOCUS ADJUSTMENT METHOD

(75) Inventor: Shouwei Wang, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 11/826,181

(22) Filed: Jul. 12, 2007

(65) Prior Publication Data

US 2008/0012978 A1    Jan. 17, 2008

(30) Foreign Application Priority Data

Jul. 13, 2006    (JP) .............................. 2006-192855

(51) Int. Cl.
  *H04N 5/232*    (2006.01)
  *G03B 17/00*    (2006.01)
(52) U.S. Cl. ........................ 348/345; 396/79
(58) Field of Classification Search ......... 348/345–354, 348/356; 396/79, 82, 89, 133
  See application file for complete search history.

(56) References Cited

U.S. PATENT DOCUMENTS

| | | | |
|---|---|---|---|
| 6,124,890 A * | 9/2000 | Muramoto | 348/345 |
| 7,382,411 B2 * | 6/2008 | Watanabe | 348/349 |
| 7,433,586 B2 * | 10/2008 | Onozawa | 396/121 |
| 7,499,096 B2 * | 3/2009 | Yamazaki | 348/348 |
| 2004/0212721 A1 * | 10/2004 | Watanabe | 348/345 |
| 2005/0270410 A1 * | 12/2005 | Takayama | 348/345 |
| 2006/0203118 A1 * | 9/2006 | Hirai | 348/345 |

FOREIGN PATENT DOCUMENTS

JP    6-160695    6/1994

* cited by examiner

*Primary Examiner*—Nhan T Tran
*Assistant Examiner*—Trung Diep
(74) *Attorney, Agent, or Firm*—McGinn IP Law Group, PLLC

(57) ABSTRACT

With a half press of a shutter button, a focus lens is moved from a near distance end to a far distance end of a predetermined search range, and AF evaluation values are calculated. Based on the AF evaluation values, a maximum evaluation value and a first lens position corresponding to the maximum evaluation value are detected. If the maximum evaluation value is larger than a threshold value and the first lens position is not located at the near distance end or the far distance end, the first lens position becomes an in-focus position. If the first lens position is, for example, at the near distance end, the focus lens is moved within an extended search range set on the near distance side, and the maximum evaluation value is obtained. A second lens position corresponding to the maximum evaluation value becomes the in-focus position.

4 Claims, 10 Drawing Sheets

IMAGE CAPTURE APPARATUS AND FOCUS ADJUSTMENT METHOD

BACKGROUND OF THE INVENTION

1. Field of the Invention

The present invention relates to an image capture apparatus and a focus adjustment method in which a focus of a taking lens is adjusted using a contrast method based on image data captured with a solid state imaging device.

2. Background Arts

Recently, digital cameras are commonly used. The digital camera incorporates a solid state imaging device such as a CCD image sensor, and records image data obtained by digital conversion of image signals, output from the solid state imaging device, in a recording medium such as a memory card. Such digital camera performs autofocus processing of a taking lens by the contrast method (hereinafter referred to as AF processing).

In the AF processing by the contrast method, a search range having a first range and a second range is set. The first range is set based on a focal distance or a luminance value. The second range is set on a near distance side or a far distance side (usually, infinity side) of the first range to compensate errors caused by temperature changes of the taking lens. The focus lens is moved, for example, from a near distance end to a far distance end of the search range, and AF evaluation values are calculated. Then, the focus lens is moved to a lens position (in-focus position) where the AF evaluation value reaches a maximum value. Thus, the focus adjustment is performed.

Taking lens miniaturized in accordance with miniaturization of the digital camera is vulnerable to temperature changes, and such temperature changes cause deviation of the in-focus position of the taking lens. To avoid this problem, there is a camera provided with a temperature sensor to detect the temperature of the taking lens (see, Japanese Patent Laid-Open Publication No. 06-160695). At the time of the focus adjustment, the position of the taking lens is corrected based on the detection result of the temperature sensor.

However, if the focus adjustment is performed by moving the focus lens within the search range having the first and second ranges as the above digital camera, detection of the in-focus position takes long time due to long moving distance of the focus lens. Since the camera disclosed in Japanese Patent Laid-Open Publication No. 06-160695 is provided with a temperature sensor, the number of parts is increased, which hinders the miniaturization of the camera and also increases cost. Moreover, optimum focus control of the taking lens cannot be achieved if the temperature sensor is not installed at a proper position.

SUMMARY OF THE INVENTION

An object of the present invention is to provide an image capture apparatus and a focus adjustment method capable of moving a focus lens to an in-focus position precisely and quickly.

In order to achieve the above and other objects, the image capture apparatus according to the present invention includes a lens position detecting section for detecting a lens position of the focus lens during a search, a maximum evaluation value detecting section for detecting a maximum value of the evaluation values within a search range, an end detecting section, an extended search range setting section, and an in-focus position detecting section. The end detecting section detects whether a first lens position of the focus lens is at either one end or the other end of the search range. The first lens position corresponds to a first maximum evaluation value which is a maximum evaluation value detected by the maximum evaluation value detecting section within the search range. When the first lens position is detected at the one end or the other end of the search range, the extended search range setting section sets a predetermined extended search range on the detected end side to carry out an additional search. When the end detecting section detects that the first lens position is not at the ends of the search range, the in-focus position detecting section determines the first lens position as the in-focus position. When the additional search is carried out, the in-focus position detecting section determines a second lens position as the in-focus position. The second lens position corresponds to a second maximum evaluation value which is a maximum evaluation value within the extended search range detected by the maximum evaluation value detecting section.

The image capture apparatus further includes a maximum evaluation value judging section for judging whether the first and second maximum evaluation values detected by the maximum evaluation value detecting section are smaller than a predetermined threshold value. If the maximum evaluation value judging section judges that the first maximum evaluation value is smaller than the threshold value, the extended search range setting section sets the extended search range at each of the ends of the search range, and the focus lens is moved within the extended search ranges to detect the second maximum evaluation value. If the maximum evaluation value judging section judges that the second maximum evaluation value is smaller than the threshold value, the focus lens is moved to a pan focus position.

In a focus adjustment method of the present invention, a first maximum evaluation value which is a maximum evaluation value within a predetermined search range, and a first lens position of a focus lens where the first maximum evaluation value is obtained are detected. If the first lens position is not at the ends of the search range, the focus lens is set at the first lens position. If the first lens position is at either end, a predetermined extended search range is set on the detected end side. The focus lens is moved within the extended search range and a second maximum evaluation value which is a maximum evaluation value within the extended search range is detected. The second lens position where the second maximum evaluation value is obtained is detected, and the focus lens is moved to the second lens position.

If the first maximum evaluation value detected in the search range is larger than a predetermined threshold value, the focus adjustment is carried out in the above described steps. However, if it is judged that the first maximum evaluation value is smaller than the threshold value, the extended search range is set at each of the ends of the search range. The focus lens is moved within the extended search ranges, and it is judged whether the second maximum evaluation value detected within the extended search ranges is smaller than the threshold value. If the second maximum evaluation value is larger than the threshold value, the focus lens is set at the second lens position. However, if it is judged that the second maximum evaluation value is smaller than the threshold value, the focus lens is moved to the pan-focus position.

According to the present invention, if the maximum evaluation value is detected at a point other than the both ends of the search range, the lens position corresponding to the maximum evaluation value becomes the in-focus position of the focus lens. If the maximum evaluation value is detected at either end of the search range, an additional search is carried out within a predetermined extended search range which extends from the detected end. Thus, the focus adjustment is carried out quickly and precisely.

If the maximum evaluation values in the predetermined search range and the extended search ranges provided on both sides of the predetermined search range are smaller than the threshold value, the in-focus position is set at the pan-focus position. Thus, focus bias is avoided and images of satisfactory quality are obtained.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
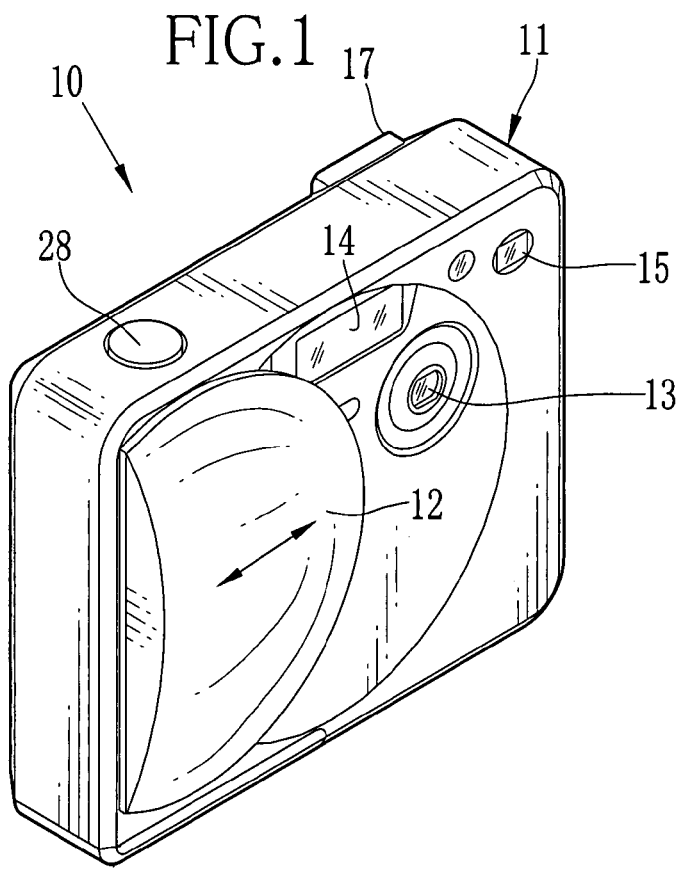
FIG. 1 is a front perspective view of a digital camera according to the present invention.
Figure 2:
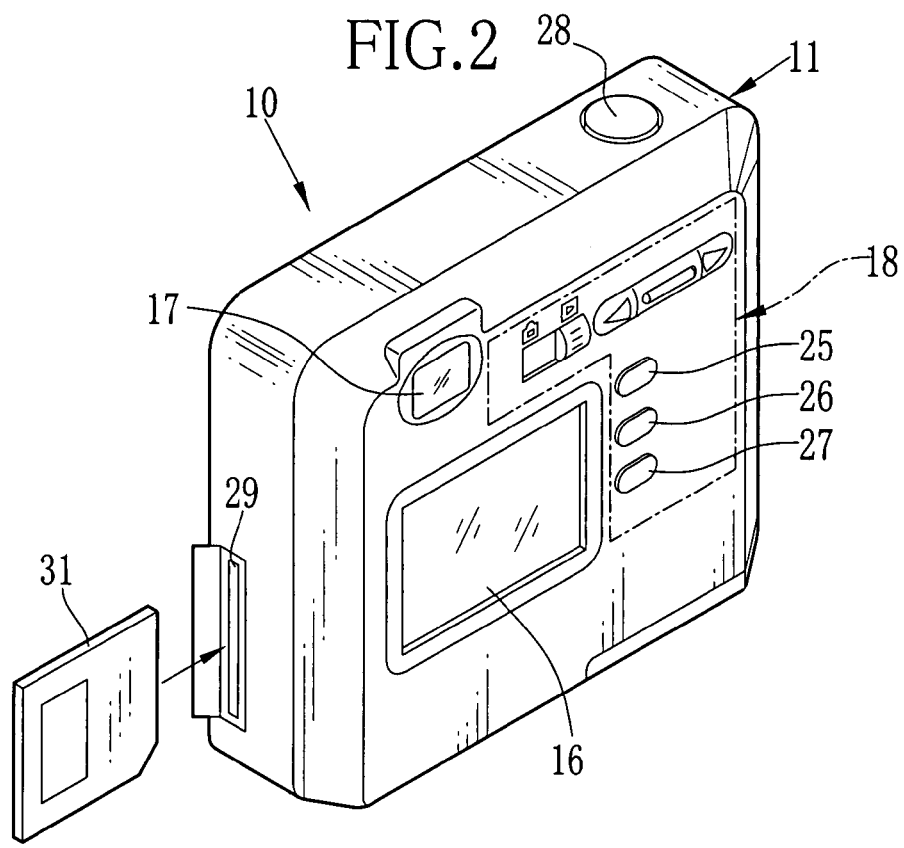
FIG. 2 is a rear perspective view of the digital camera according to the present invention.

In FIGS. 1 and 2, a digital camera 10 has a slidable lens barrier 12 on a front face of a main body 11. Sliding the lens barrier 12 to an open position (the position shown in FIG. 1) exposes a taking lens 13 and a flash emitting section 14 on the front face.

The lens barrier 12 also functions as a power supply ON/OFF member. The power is turned on when the lens barrier 12 is slid to the open position, and turned off when the lens barrier 12 is slid to a shield position to shield the taking lens 13 and the flash emitting section 14. Also provided on the front face of the main body 11 is a front viewfinder window 15 which constitutes an optical finder.

Provided on a rear face of the main body 11 are an LCD 16, a rear viewfinder window 17, and an operating section 18. The rear viewfinder window 17 also constitutes the optical finder. Reproduced images, various setting screens, through images, and the like are displayed on the LCD 16.

The operating section 18 is constituted of a menu button 25, a cancel button 26, and a display button 27. Pressing the menu button 25 displays the menu screen on the LCD 16. Pressing the cancel button 26 cancels an ongoing setting operation on the menu screen, or causes a display to return to a previous screen. Pressing the display button 27 turns the LCD 16 on and off.

A shutter button 28 is provided on a top face of the main body 11. The shutter button 28 is pressed in two steps. After a framing is determined through the LCD 16 or the optical finder, when a shutter button 28 is lightly pressed (half pressed), various capturing preparatory processing such as exposure adjustment and focus adjustment of the taking lens is performed. When the shutter button 28 is further pressed (fully pressed) from the half press state, an image is captured.

A memory card slot 29 is provided on a side face of the main body 11. A memory card 31 which is a recording medium to record image data is removably inserted in the memory card slot 29.

Figure 3:
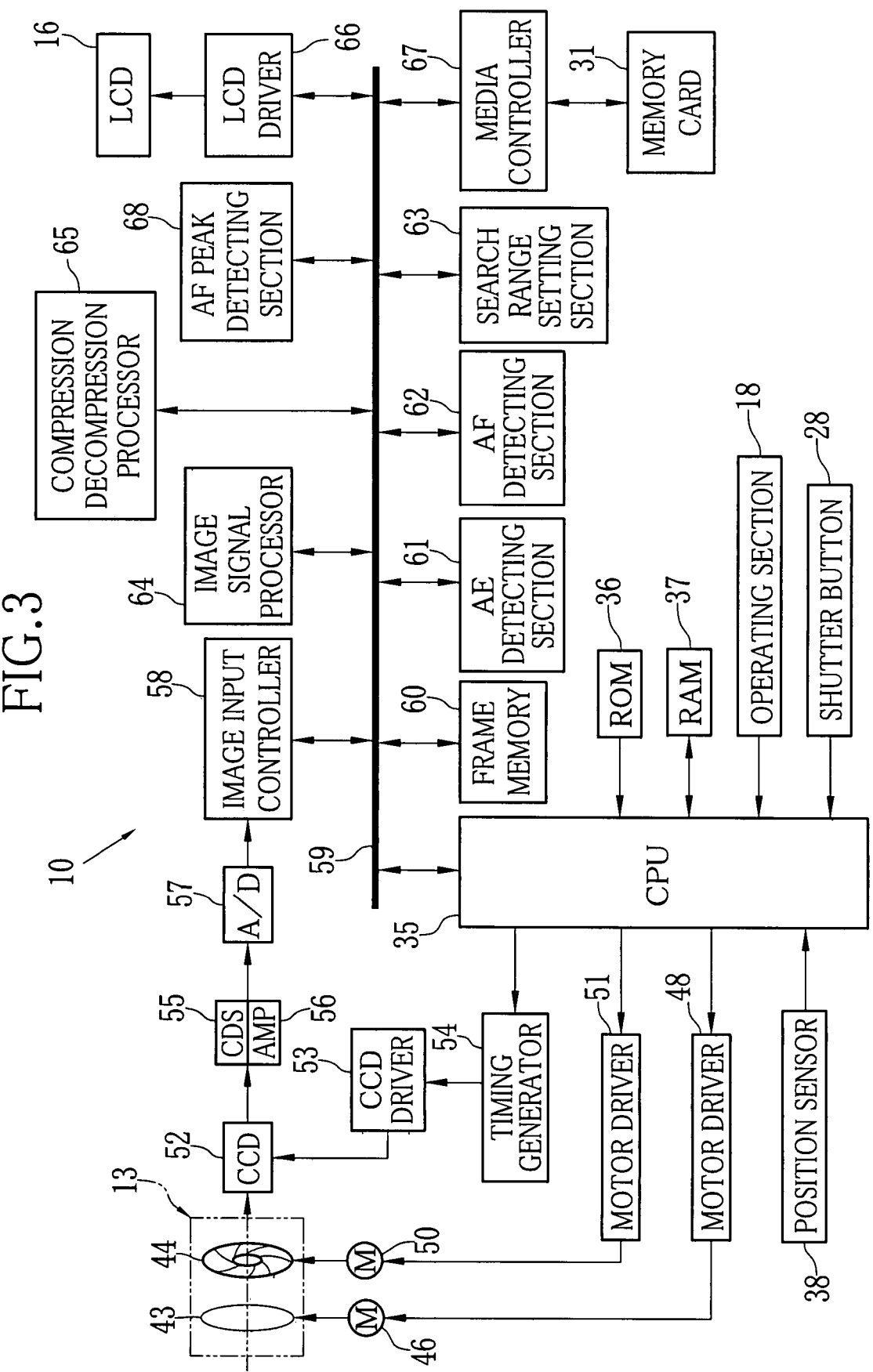
FIG. 3 is a block diagram showing an electrical configuration of the digital camera.
Figure 4:
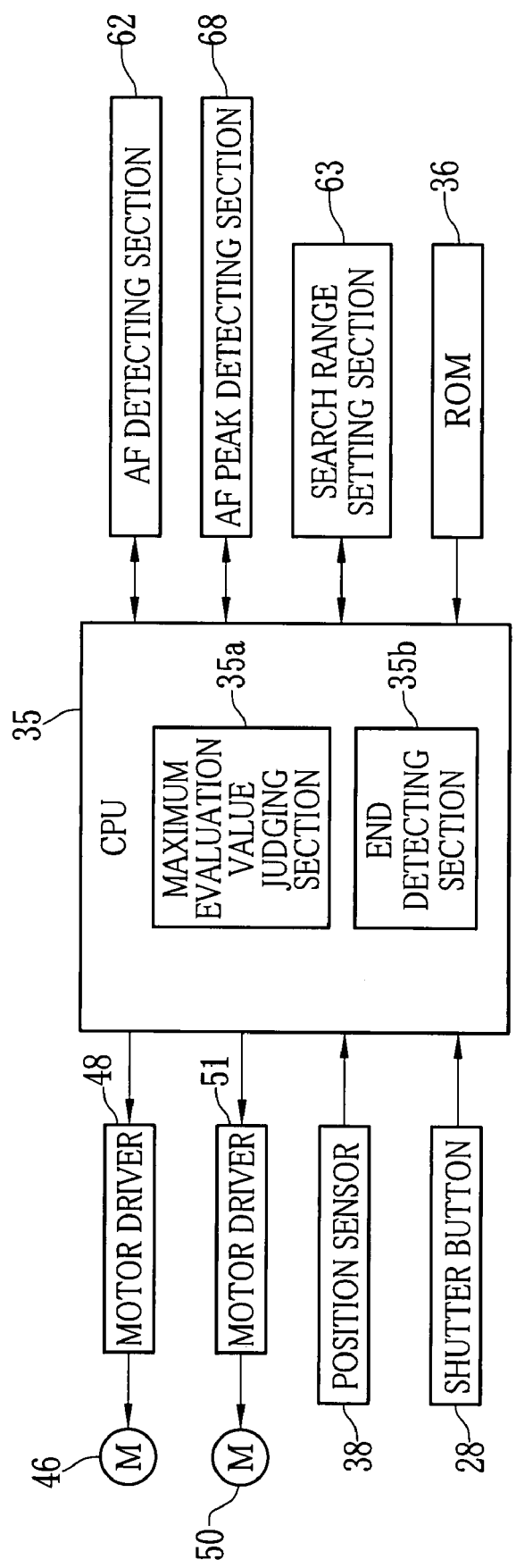
FIG. 4 is a block diagram of a focus adjustment device.

In FIGS. 3 and 4, the digital camera 10 has a CPU 35 which is a control section for controlling the digital camera 10. Connected to this CPU 35 are a ROM 36 and a RAM 37. The CPU 35 controls each section of the digital camera 10 based on a control program and various control data stored in the ROM 36. Working data is temporarily stored in the RAM 37.

Connected to the CPU 35 are the above described shutter button 28, the operating section 18, a position sensor 38 and the like. The CPU 35 obtains operation signals from the operating section 18 and the shutter button 28, and performs processing corresponding to each of the operation signals. The position sensor 38 detects a lens position of a focus lens 43.

The taking lens 13 is constituted of the focus lens 43 and an aperture stop 44. The focus lens 43 is connected to a motor 46. The CPU 35 controls the motor 46 through a motor driver 48, and the motor 46 moves the focus lens 43 in an optical axis direction to adjust the focus.

The position sensor 38, which is a lens position detecting section, detects a lens position of the focus lens 43, and inputs the detected lens position to the CPU 35. A motor 50 changes an aperture size of the aperture stop 44 to change a light amount of subject light entering a CCD image sensor (a solid state imaging device) 52. The CPU 35 controls the motor 50 through a motor driver 51 and adjusts the aperture size of the aperture stop 44.

Disposed at the rear of the taking lens 13 is the CCD image sensor 52 which performs photoelectric conversion of the subject light passed through the taking lens 13. Connected to the CCD image sensor 52 is a CCD driver 53. The CCD driver 53 drives the CCD image sensor 52 by inputting a vertical drive signal and a horizontal drive signal to the CCD image sensor 52 in response to a clock pulse input from a timing generator 54. The timing generator 54 is connected to the CPU 35. The CPU 35 controls the timing generator 54 to generate the clock pulse.

Connected to the CCD image sensor 52 are a correlated double sampling circuit (CDS) 55 and an amplifier (AMP) 56. The image signal output from the CCD image sensor 52 is subjected to noise reduction and amplification in the CDS 55 and the AMP 56 respectively.

Thereafter, the image signal is converted into image data of a digital signal by an A/D converter 57 and output to an image input controller 58. The image input controller 58 is connected to a frame memory 60 via a data bus 59. The CPU 35 controls the image input controller 58 and records the image data in the frame memory 60.

Connected to the data bus 59, in addition to the image input controller 58 and the frame memory 60, are the CPU 35, an AE detecting section 61, an AF detecting section 62, a search range setting section 63, an image signal processor 64, a compression/decompression processor 65, an LCD driver 66, a media controller 67, and an AF peak detecting section 68.

The AE detecting section 61 detects a luminance value of a subject based on the image data, and outputs the detected luminance value to the CPU 35. The AE detecting section 61 uses centerweighted metering method which integrates the luminance values of an image while assigning weights to the central part of the image, instead of average metering method which integrates luminance values of the entire image. The CPU 35 controls electronic shutter speed of the CCD image sensor 52 and the aperture stop 44 based on the luminance value to obtain an optimum light amount of the subject light entering the CCD image sensor 52.

The search range setting section 63 reads from the ROM 36 a search range and an extended search range within which the focus lens 43 is moved for focus adjustment, and sets them. A search range Q-R (see FIG. 5), and extended search ranges Q-S and R-T (see FIGS. 6 and 7) which extend the search range Q-R are previously stored in the ROM 36 in accordance with aperture size information (f number). At the time of the focus adjustment, upon obtaining the aperture size information of the aperture stop 44 from the CPU 35, the search range setting section 63 reads the optimum search range Q-R from the ROM 36 and sets it. The search range setting section 63 also functions as an extended search range setting section, and reads from the ROM 36 the extended search ranges Q-S and R-T which extend the search range Q-R in accordance with a focal distance and depth of field.

Figure 5:
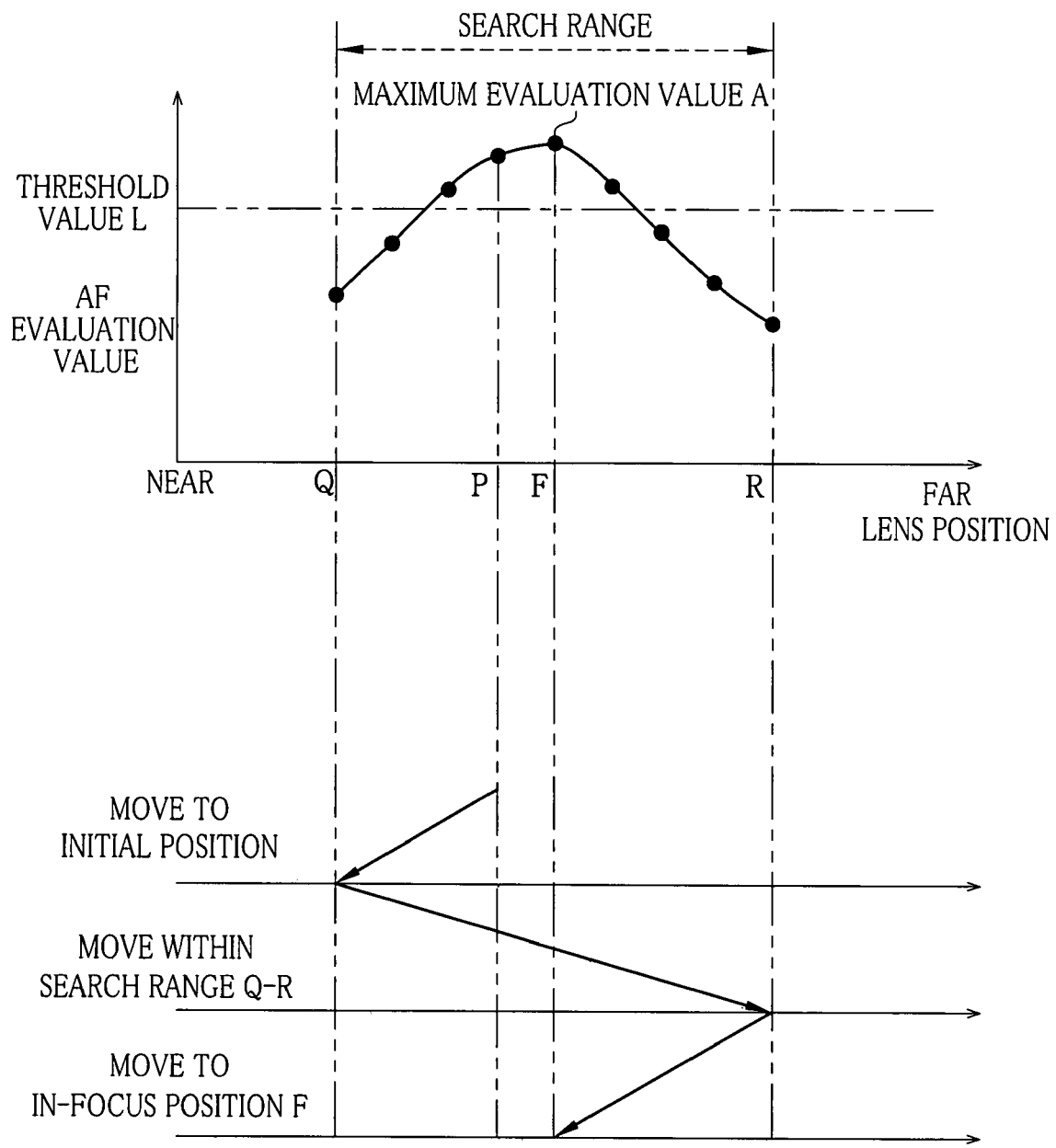
FIG. 5 is an explanatory view of a focus adjustment method in a case where an in-focus position is within a search range.

The AF detecting section 62 sequentially integrates high frequency components of an output image data and obtains an AF evaluation value every time the focus lens 43 is moved for a predetermined amount, for example as shown in FIG. 5, from a near distance end Q (one end) to a far distance end R (the other end) of the search range Q-R. The AF evaluation values are input to an AF peak detecting section 68. The AF peak detecting section 68 is a maximum evaluation value detecting section and detects a maximum evaluation value A (first maximum evaluation value) which is the maximum AF evaluation value obtained in the search range Q-R. The AF evaluation values and the maximum evaluation value A are input to the CPU 35.

As shown in FIG. 4, the CPU 35 has a maximum evaluation value judging section 35*a*. The maximum evaluation value judging section 35*a* judges whether the maximum evaluation value A input from the AF peak detecting section 68 is smaller than a preset threshold value L (see FIG. 5). If it is judged that the maximum evaluation value A is larger than the threshold value L, lens position detecting processing is performed. If it is judged that the maximum evaluation value A is smaller than the threshold value L, the search range setting section 63 performs extended search range setting processing.

During the lens position detecting processing, a first lens position of the focus lens 43 where the maximum evaluation value A is obtained is detected. If it is judged that the maximum evaluation value A is larger than the threshold value L, the CPU 35 detects the first lens position based on the lens position from the position sensor 38. An end detecting section 35*b* provided in the CPU 35 detects whether the first lens position is located at the near distance end Q or the far distance end R.

Figure 6:
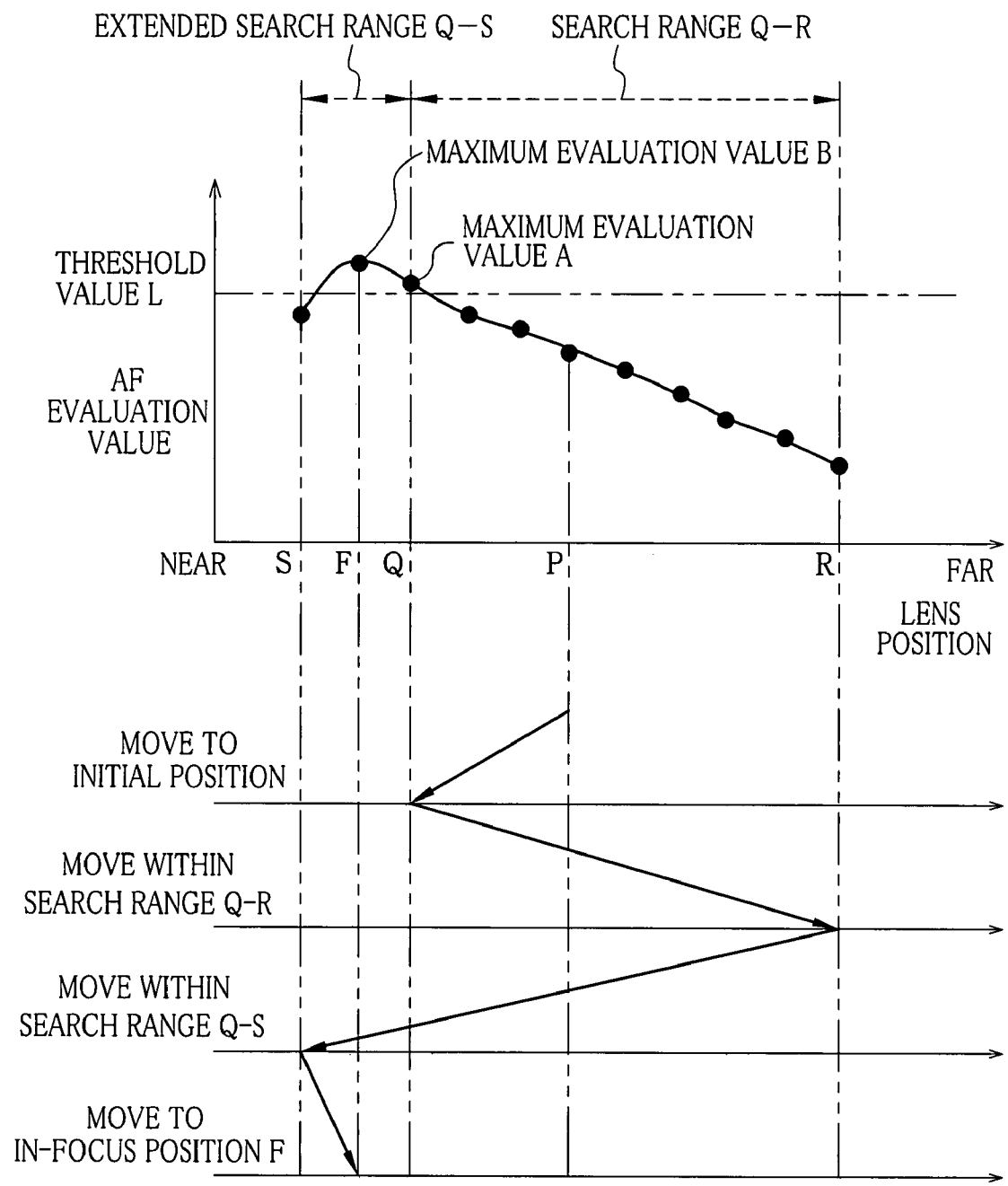
FIG. 6 is an explanatory view of a focus adjustment method in a case where an in-focus position is outside the search range and close to a near distance side.
Figure 7:
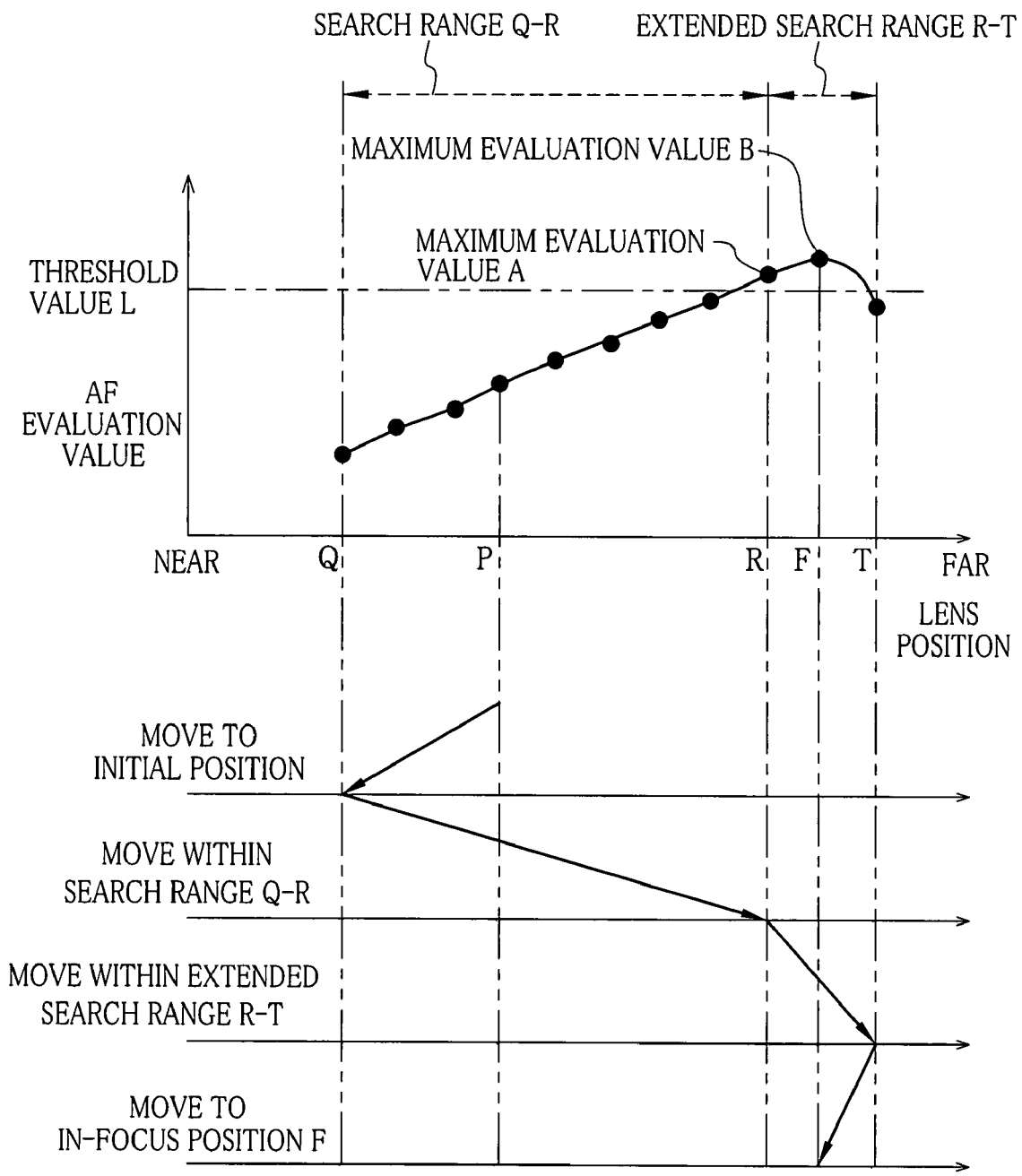
FIG. 7 is an explanatory view of a focus adjustment method in a case where an in-focus position is outside the search range and close to a far distance side.

As shown in FIG. 6, when it is detected that the first lens position is at the near distance end Q, that is, the AF evaluation value reaches the maximum evaluation value A at the near distance end Q, the CPU 35 outputs a near distance side extension signal to the search range setting section 63. As shown in FIG. 7, when it is detected that the first lens position is at the far distance end R, that is, the AF evaluation value reaches the maximum evaluation value A at the far distance end R, the CPU 35 outputs a far distance side extension signal to the search range setting section 63. As shown in FIG. 5, when it is detected that the first lens position is between the near distance end Q and the far distance end R, the CPU 35 moves the focus lens 43 to this first lens position.

Upon receiving the near distance side extension signal from the CPU 35, as shown in FIG. 6, the search range setting section 63 sets an extended end S at a position closer than the near distance end Q, and sets an extended search range Q-S. Thereafter, the CPU 35 moves the focus lens 43 from the near distance end Q to the extended end S. The AF detecting section 62 sequentially calculates the AF evaluation value every time the focus lens 43 is moved for a predetermined amount within the extended search range Q-S, and inputs the AF evaluation values to the AF peak detecting section 68.

The AF peak detecting section 68 detects a maximum evaluation value B within the extended search range Q-S based on the input AF evaluation values. The AF peak detecting section 68 inputs to the CPU 35 the AF evaluation values and the maximum evaluation value B (second maximum evaluation value) obtained within the extended search range Q-S. Based on the lens position input from the position sensor 38, the CPU 35 detects a second lens position where the maximum evaluation value B of the extended search range Q-S is obtained, and moves the focus lens 43 to the second lens position (in-focus position F).

In the same manner as above, upon receiving the far distance-side extension signal from the CPU 35, as shown in FIG. 7, the search range setting section 63 sets an extended end T further than the far distance end R, and sets an extended search range R-T. When the extended search range R-T is set on the far distance side, the AF detecting section 62 sequentially calculates the AF evaluation values within the extended search range R-T every time the CPU 35 moves the focus lens 43 for a predetermined amount from the far distance end R to the extended end T. Based on the calculated AF evaluation values, the AF peak detecting section 68 detects the maximum evaluation value B. Based on the lens position from the position sensor 38, the CPU 35 detects the second lens position where the maximum evaluation value B is obtained, and moves the focus lens 43 to the second lens position (in-focus position F).

Figure 8:
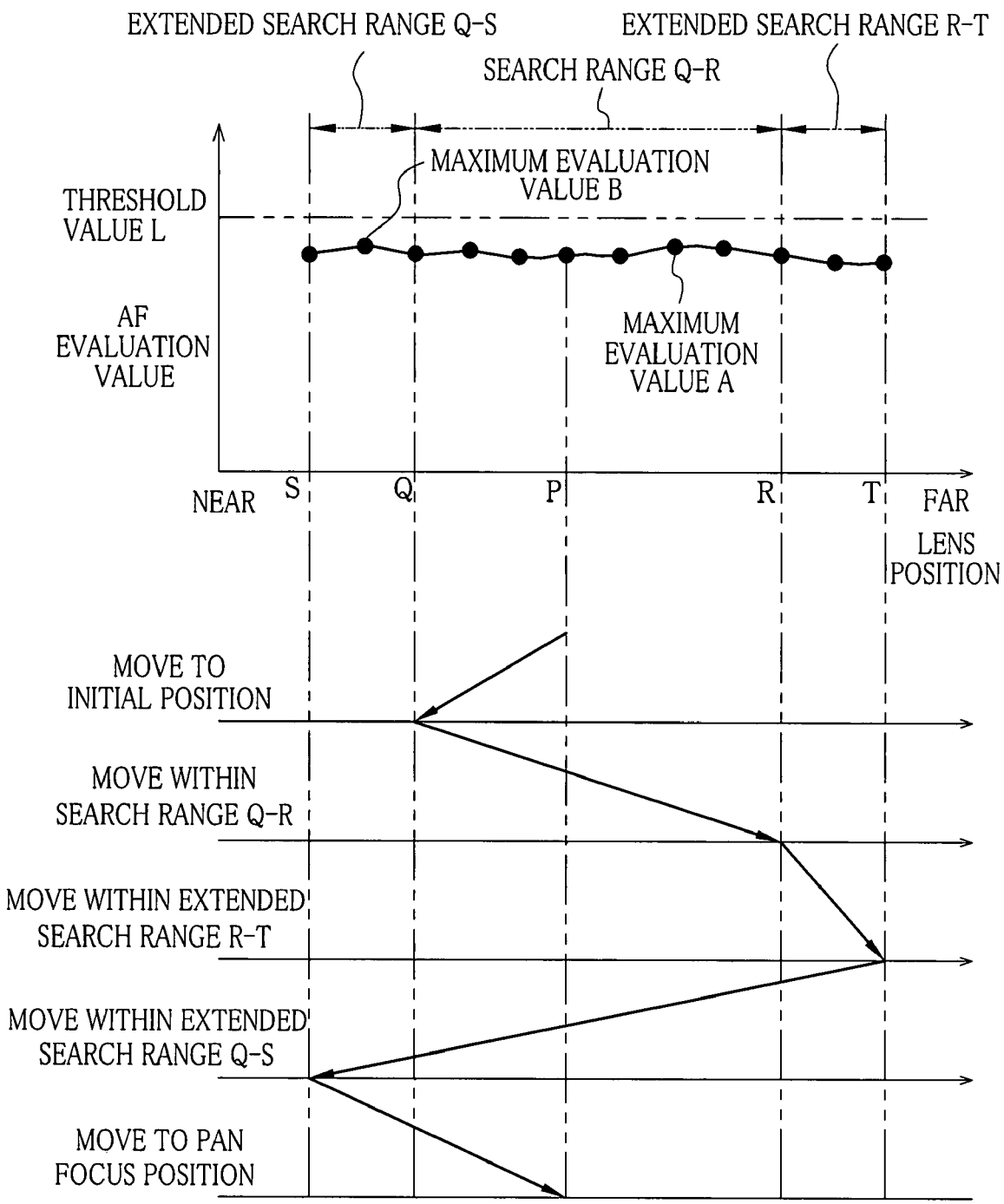
FIG. 8 is an explanatory view of a focus adjustment method in a case where the maximum evaluation value is smaller than a threshold value.

In the extended search range setting processing, the extended search ranges Q-S and R-T are set on the near distance side and the far distance side of the search range Q-R. When it is judged that the maximum evaluation value A is smaller than the threshold value L, as shown in FIG. 8, the search range setting section 63 performs the extended search range setting processing. The CPU 35 moves the focus lens 43 within the extended search ranges Q-S on the near distance side and the R-T on the far distance side, and the AF detecting section 62 calculates the AF evaluation values. The AF evaluation values are input to the AF peak detecting section 68.

Based on the AF evaluation values, the AF peak detecting section 68 detects the maximum evaluation value B. The maximum evaluation value judging section 35*a* judges whether the maximum evaluation value B is larger than the threshold value L. When the maximum evaluation value B is larger than the threshold value L, the CPU 35 moves the focus lens 43 to the second lens position where the maximum evaluation value B is obtained. If it is judged that the maximum evaluation value B is smaller than the threshold value L, as shown in FIG. 8, the focus lens 43 is moved to a pan focus position P.

The image signal processing section 64 performs various image processing such as gradation conversion, color interpolation, and YC conversion to the image data stored in the frame memory 60. When the image data of the low resolution used for displaying the through images is stored in the frame memory 60, the image signal processing section 64 sends the image data to the LCD driver 66 via the data bus 59 after the above image processing. The LCD driver 66 performs signal processing to the image data and displays the image on the LCD 16.

When the image data of the high resolution used for recording the images is stored in the frame memory 60, the image data is subjected to the above processing in the image signal processing section 64, and then compressed in a format such as JPEG by the compression/decompression processor 65. Thereafter, the media controller 67 records the compressed image data in the memory card 31 which is the recording medium.

In a reproduction mode, the media controller 67 reads the image data from the memory card 31. The image data is temporarily stored in the frame memory 60, and then decompressed by the compression/decompression processor 65. Thus, an image is displayed on the LCD 16.

Figure 9:
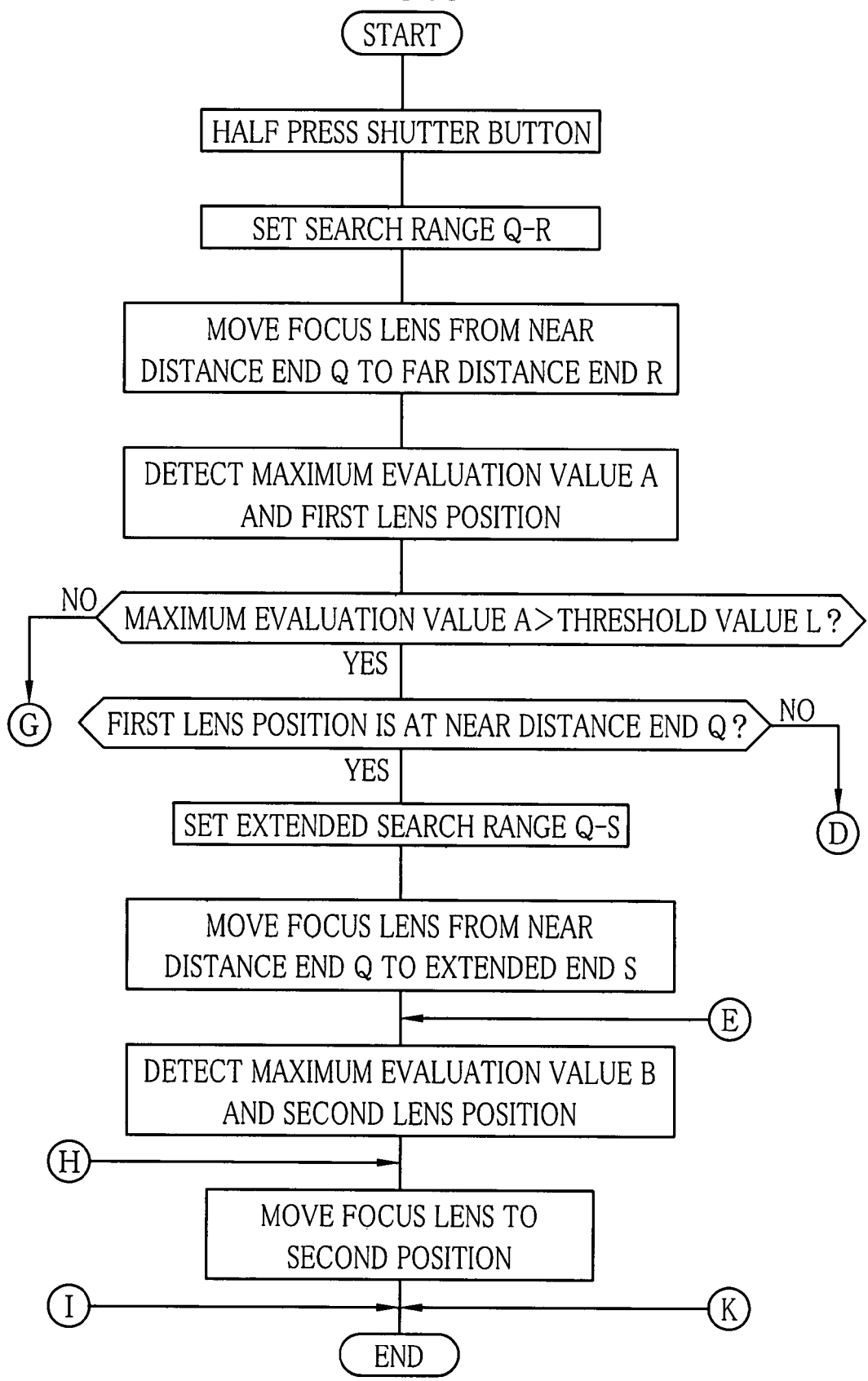
FIG. 9 is a flowchart showing steps of focus adjustment.
Figure 10:
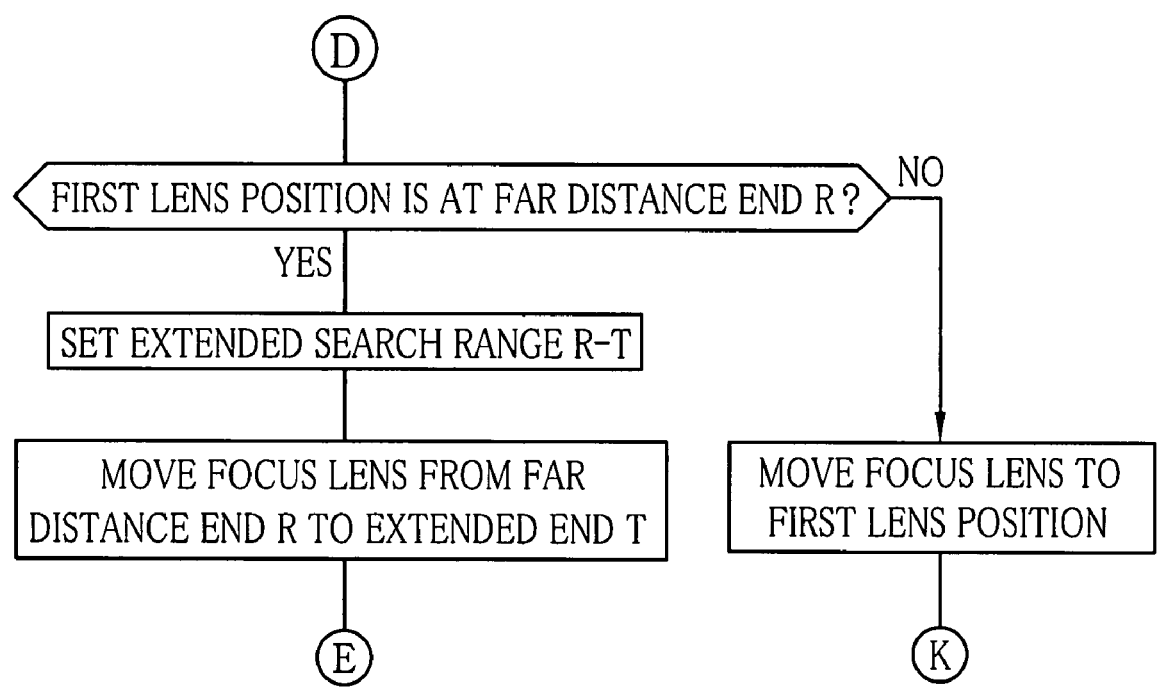
FIG. 10 is a flowchart showing steps of the focus adjustment.
Figure 11:
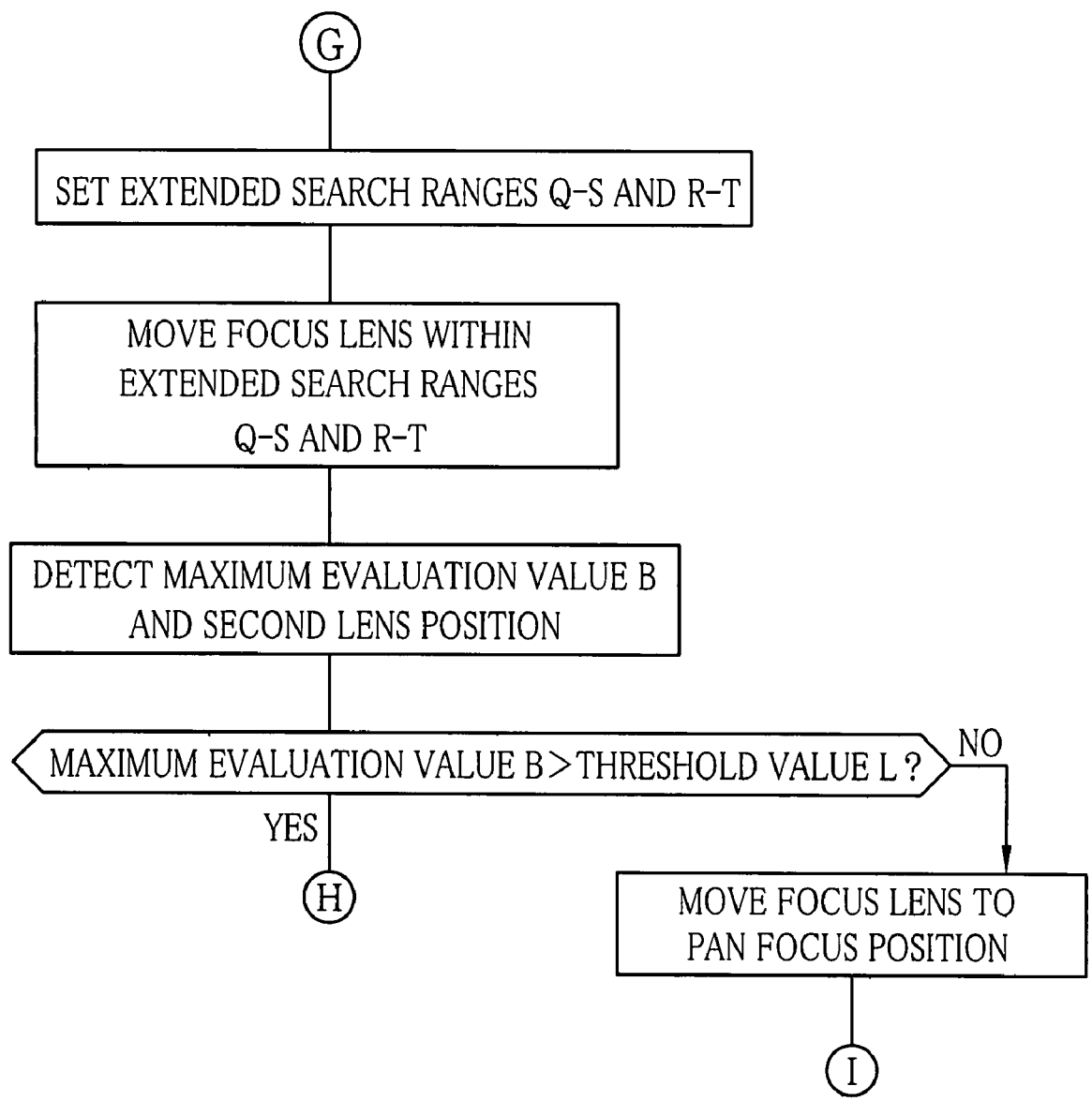
FIG. 11 is a flowchart showing steps of the focus adjustment.

Next, a focus adjustment method of the above configured digital camera is described with reference to flowcharts shown in FIGS. 9 to 11. When the digital camera 10 is set in an image capture mode, and the shutter button 28 is not half pressed, the CPU 35 moves the focus lens 43 to the pan focus position P. Thereby, through images are output from the CCD image sensor 52 and displayed on the LCD 16.

When the shutter button 28 is half pressed, the search range setting section 63 sets the optimum search range Q-R, which is stored in the ROM 36, based on the aperture size information from the CPU 35. Thereafter, as shown in FIGS. 5 to 8, the CPU 35 moves the focus lens 43 from the pan focus position P to the near distance end Q which is an initial position, and then to the far distance end R with one step (a predetermined amount) at a time. Each step is indicated by a circle mark in the above figures. Depending on the position of the focus lens 43, an interval between the steps (the circle marks), that is, a moving amount of the focus lens 43 changes.

Every time the focus lens 43 is moved within the search range Q-R, the AF evaluation value is sequentially calculated from the image data output from the CCD image sensor 52, and the maximum evaluation value A within the search range Q-R is detected. Thereafter, it is judged whether the maximum evaluation value A is smaller than the threshold value L. If the maximum evaluation value A is larger than the threshold value L, it is detected whether the first lens position where the maximum evaluation value A is obtained is at the near distance end Q or the far distance end R.

When the AF values within the search range Q-R is indicated as, for example, a distribution curve having an outward curve as shown in FIG. 5, in other words, when it is detected that the first lens position is located between the near distance end Q and the far distance end R, the CPU 35 moves the focus lens 43 which has been moved to the far distance end R to the first lens position where the maximum evaluation value A is obtained. Namely, the first lens position becomes the in-focus position F. Thus, the focus lens 43 is moved within a small range, and the focus adjustment is quickly performed.

When the AF evaluation values within the search range Q-R are indicated as a distribution curve which decreases from the near distance side to the far distance side as shown in FIG. 6, in other words, when it is detected that the first lens position is located at the near distance end Q, the near distance side extension signal is input to the search range setting section 63. Thereby, the extended end S is set at a position closer than the near distance end Q, and the extended search range Q-S is set to extend the search range Q-R. As shown in arrows in solid lines in FIG. 6, the focus lens 43 is moved to the far distance end R, and then back to the near distance end Q, and further to the extended end S. The AF detecting section 62 calculates the AF evaluation value from the image data every time the focus lens 43 is moved within the extended search range Q-S, and the AF peak detecting section 68 detects the maximum evaluation value B.

After the focus lens 43 is moved from the near distance end Q to the extended end S, the second lens position where the maximum evaluation value B within the extended search range Q-S is obtained is detected, and the focus lens 43 is moved from the extended end S to the second lens position. That is, the second lens position becomes the in-focus position F. In FIG. 6, the maximum evaluation value B is located within the extended search range Q-S. However, if the maximum evaluation value B is detected at the near distance end Q, in other words, if the first and the second lens positions are identical, the focus lens 43 is moved from the extended end S to the near distance end Q. If the maximum evaluation value B is detected at the extended end S, the extended end S becomes the second lens position, so the focus lens 43 stays at the extended end S.

When the AF evaluation values calculated within the search range Q-R are indicated as a distribution curve which increases from the near distance side to the far distance side as shown in FIG. 7, in other words, when it is detected that the first lens position is at the far distance end R, the far distance side extension signal is input to the search range setting section 63. In response to this, the search range setting section 63 sets the extended end T at a position further than the far distance end R, and sets the extended search range R-T to extend the search range Q-R. As shown in arrows in solid lines in FIG. 7, the focus lens 43 is moved from the near distance end Q to the far distance end R, and then to the extended end T. The AF detecting section 62 calculates the AF evaluation value from the image data every time the focus lens 43 is moved for a predetermined amount within the extended search range R-T, and the AF peak detecting section 68 detects the maximum evaluation value B.

When the focus lens 43 is moved from the far distance end R to the extended end T, the second lens position where the maximum evaluation value B within the extended search range R-T is obtained is detected, and the focus lens 43 is moved from the extended end T to the second lens position. In other words, the second lens position becomes the in-focus position F. In the same manner as the above extended search range Q-S on the near distance side, if it is detected that the second lens position is at the far distance end R, that is, the first and second lens positions are identical, the focus lens 43 which has been moved to the extended end T is moved back to the far distance end R. If the second lens position is at the extended end T, the focus lens 43 stays at the extended end T.

If it is judged that the maximum evaluation value A is smaller than the threshold value L such as, for example, the AF evaluation values within the search range Q-R indicated as a flat distribution curve as shown in FIG. 8, the extended end S is set at a position closer than the near distance end Q, and the extended end T is set at a position further than the far distance end R, and thus the extended search ranges Q-S and R-T are set to extend the search range Q-R. As shown in arrows in solid lines in FIG. 8, the focus lens 43 moved from the near distance end Q to the far distance end R is further moved to the extended end T, and the AF evaluation values are calculated. After the focus lens 43 is moved to the extended end T, the focus lens 43 is moved to the extended end S on the near distance side. At the same time, the AF evaluation values within the extended search range Q-S are calculated. The AF peak detecting section 68 detects the maximum evaluation value B based on the AF evaluation values obtained in the extended search ranges Q-S and R-T.

When the maximum evaluation value B within the extended search ranges Q-S and R-T is detected, the maximum evaluation value judging section 35a judges whether the maximum evaluation value B is smaller than the threshold value L. If it is judged that the maximum evaluation value B is larger than the threshold value L, the focus lens 43 is moved to the second lens position (in-focus position F) where the maximum evaluation value B is detected (not shown). If it is judged that the maximum evaluation value B is smaller than the threshold value B, the focus lens 43 is moved to the pan focus position P as shown in FIG. 8.

As described in the above embodiment, the small search range Q-R is set, and the focus lens 43 is moved within the search range Q-R. When there is a possibility that the in-focus position F exists outside the search range Q-R, the extended search range Q-S or the extended search range R-T is set, and the in-focus position F is detected. Accordingly, the focus adjustment is performed precisely and quickly.

In the above embodiment, the AF evaluation values within the search range Q-R are calculated while the focus lens 43 is moved from the near distance end Q to the far distance end R. However, the calculation of the AF evaluation values is not limited to the above. It is also possible to calculate the AF evaluation values while the focus lens 43 is moved from the far distance end R to the near distance end Q. Additionally, if the distribution curve of the AF evaluation values calculated in accordance with the movement of the focus lens 43 shows a tendency to decrease at a point within the search range Q-R, it is also possible to stop the focus lens 43 at that point and set an extended search range without moving the focus lens 43 to the end of the search range Q-R. Thus, the focus adjustment is performed more quickly.

In the above embodiment, the digital camera 10 having the taking lens 13 which is not a zoom lens is described. However, it is also possible to apply the present invention to the digital camera having the zoom lens. In this case, it is preferable to previously record, in the ROM 36, the search ranges Q-R and the extended search ranges Q-S and R-T determined in accordance with the lens positions and the depth of field of the zoom lens.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. An image capture apparatus which moves a focus lens from an end to the other end of a predetermined search range, and calculates evaluation values by integrating high frequency components of image data output from a solid state imaging device every time said focus lens is moved for a predetermined amount within said search range, and performs focusing based on said evaluation values, said image capture apparatus comprising:

a lens position detecting section for detecting a lens position of said focus lens;

a maximum evaluation value detecting section for detecting a maximum value of said evaluation values;

an end detecting section for detecting whether a first lens position of said focus lens is at said one end or said other end of said search range, said first lens position corresponding to a first maximum evaluation value which is a maximum evaluation value within said search range detected by said maximum evaluation value detecting section;

an extended search range setting section for setting a predetermined extended search range on a side of said detected end for carrying out an additional search when said first lens position is detected at said one end or said other end; and an in-focus position detecting section which determines said first lens position as an in-focus position if said end detecting section detects said first lens position is not at said ends of said search range, and determines a second lens position as said in-focus position when said additional search is carried out, said second lens position corresponding to a second maximum evaluation value which is a maximum evaluation value within said extended search range detected by said maximum evaluation value detecting section.

2. An image capture apparatus according to claim 1, further comprising:

a maximum evaluation value judging section for judging whether said first and second maximum evaluation values detected by said maximum evaluation value detecting section are smaller than a predetermined threshold value;

wherein if said maximum evaluation value judging section judges said first maximum evaluation value is smaller than said threshold value, said extended search range setting section sets said extended search range at each of said ends of said search range and said focus lens is moved within said extended search ranges to detect said second maximum evaluation value, and if said maximum evaluation value judging section judges said second maximum evaluation value is smaller than said threshold value, said focus lens is moved to a pan focus position.

3. A focus adjustment method in which a focus lens is moved from an end to the other end of a predetermined search range, and evaluation values are calculated by integrating high frequency components of image data output from a solid state imaging device every time said focus lens is moved for a predetermined amount within said search range, and said focus lens is moved based on said evaluation values, said focus adjustment method comprising:

(A) detecting a first maximum evaluation value which is a maximum evaluation value within said search range;

(B) detecting a first lens position of said focus lens where said first maximum evaluation value is detected;

(C) detecting whether said first lens position is at said one end or said other end;

(D) setting said focus lens in said first lens position when said first lens position is not at said one end or said other end;

(E) setting a predetermined extended search range on a side of said detected end to carry out an additional search when said first lens position is at said one end or said other end;

(F) moving said focus lens within said extended search range and detecting a second maximum evaluation value which is a maximum evaluation value within said extended search range;

(G) detecting a second lens position where said second maximum evaluation value is detected; and (H) moving said focus lens to said second lens position.

4. A focus adjustment method according to claim 3, further comprising the steps of:

judging whether said first maximum evaluation value detected in said search range is smaller than a predetermined threshold value;

returning to said step (C) when it is judged that said first maximum evaluation value is larger than said threshold value;

setting said extended search range at each of said ends of said search range to carry out an additional search when it is judged that said first maximum evaluation value is smaller than said threshold value;

moving said focus lens within said extended search ranges and judging whether said second maximum evaluation value detected within said extended search ranges is smaller than said threshold value;

returning to said step (G) when it is judged that said second maximum evaluation value is larger than said threshold value; and moving said focus lens to a pan focus position when it is judged that said second maximum evaluation value is smaller than said threshold value.

\* \* \* \* \*